United States Patent [19]

Jiles

[11] Patent Number: 4,501,070
[45] Date of Patent: Feb. 26, 1985

[54] PIPE THREAD GAUGING TOOL

[76] Inventor: Stephen L. Jiles, 1513 Dogwood Ave., Anaheim, Calif. 92801

[21] Appl. No.: 572,826

[22] Filed: Jan. 23, 1984

[51] Int. Cl.³ .............................................. G01B 3/36
[52] U.S. Cl. .................................. 33/199 R; 33/199 B
[58] Field of Search ............. 33/199 R, 199 B, 147 M

[56] References Cited

U.S. PATENT DOCUMENTS

| | | | |
|---|---|---|---|
| 1,854,242 | 4/1932 | Allison et al. | 33/199 R |
| 1,979,731 | 11/1934 | Burge et al. | 33/199 R |
| 2,630,633 | 3/1953 | Webb | 33/199 R |
| 3,270,427 | 9/1966 | Johnson | 33/199 R |
| 3,388,476 | 6/1968 | Johnson | 33/199 R |

*Primary Examiner*—Willis Little
*Attorney, Agent, or Firm*—Bruce L. Birchard

[57] ABSTRACT

A tool is provided which incorporates a ring gauge into which the external tapered threads of a pipe are screwed by hand until tight, at which time a mechanical impulse of predetermined, consistent amplitude and duration is applied to the pipe-gauge combination from a hammer portion of the tool propelled, by rapidly-released spring energy against an anvil portion of the tool, the impulse being immediately coupled to the joint between the pipe threads being checked and the ring gauge, for overcoming any dirt or nicks in the thread which are restricting the engagement of the thread by the ring gauge.

12 Claims, 4 Drawing Figures

PIPE THREAD GAUGING TOOL

BACKGROUND OF THE INVENTION

1. Field of the Invention

This invention relates to the field of tools for the quality control of pipes and more particularly to tools for gauging external taper threads on pipes.

2. Prior Art

The American National Standards Institute, Inc. standards for pipe threads at Section 8, Paragraph No. 36, entitled "Gauging External Taper Threads", states that in gauging external taper threads an appropriate ring gauge is screwed handtight onto the pipe or external thread. The thread is within the permissable tolerance when the gauging face of the working ring gauge is not more than one turn, large or small, from being flush with the end of the thread. Thus, the practice in the past, has been to screw the ring gauge onto the end of the pipe, the tapered thread of which is being checked, and if the gauge can be screwed onto the pipe until the outer surface of the gauge is flush with the end of the pipe plus or minus one turn, the pipe is acceptable. However, experience has taught that, many times, there is a nick in one of the threads at a crucial point and the ring gauge may stop at that point if subjected only to the pressure that can be produced by the human hand. Many times such a nick is inconsequential as far as operation or use of the pipe is concerned and to avoid useless waste of pipe and high rejection rates it has been the practice to pound the pipe at its remote end on a cement floor to dislodge any dirt or to overcome any small nicks in the pipe threads being checked. That practice is provided for in Paragraph 38 of Section 8 of the American National Standards Institute, Inc.'s "Pipe Threads" standard which says, "In gauging pipe threads it is common practice to tap or wrap the part to assure proper seating of the gauge in or on the product thread. However, it is first necessary to clean both the gauge and the product threads so that they are free of chips, burrs, or other abrasives." Obviously, this is not a scientific method for gauging the acceptability of the pipes and their tapered threads. Attempts have been made to establish tapping and wrapping standards to attempt to achieve consistent quality control results. The quality control inspection instructions of the Southern California Gas Company, a very large user of pipes with external tapered threads, quotes from the American Society for testing materials Bulletin A733, "Steel Pipe Nipples" a definition of the wrapping technique used in the past, as follows: Swing the end of the fitting with the gauge attached through an arc of approximately four to six inches to allow the fitting to strike against the solid metal surface. This is used to eliminate any binding due to slight nicks or foreign matter in the thread". While this procedure may give some consistency to the results, it is still highly subjective in nature and cannot be expected to achieve a high level of consistency.

In a facility which manufactures or utilizes millions of feet of taper-threaded pipe a year, it is obviously desirable to maintain a high-quality of tapered thread at the same time as achieving a low reject rate on the pipes which are either manufactured or purchased to be utilized. Up until the date of my invention, no method for getting consistent quality control results has been available.

Therefore, it is an object of my invention to overcome the various disadvantages of prior art devices and methods, as set forth hereinbefore.

It is a further object of my invention to provide a tool which will provide to the tapping and wrapping step in the quality control of tapered threads on pipes the maximum degree of consistency while assuring maximum quality of the pipes which are found to be acceptable under the quality standards, utilizing my tool.

SUMMARY OF THE INVENTION

The tool according to my invention incorporates a standard ring gauge for the appropriate-sized pipe. Such ring gauge is removable and replaceable by a ring gauge for a different-sized pipe. Once the tapered thread of the pipe to be checked is screwed into the ring gauge incorporated in the tool of my invention, a handle which is releasably connected to a hammer is cocked, in the process of which the hammer is moved away from an anvil within the tool. As the hammer moves away from the anvil, a spring to which the hammer is attached is stressed and energy is stored in that spring up until the point at which the handle rapidly disconnects from a rod associated with the hammer and the hammer is permitted to move at high-speed until it engages the anvil portion of the tool to which the hammer releases the impulse of energy transferred to it by the spring, such energy being in kinetic form when the hammer portion engages the anvil portion. The mechanical impulse developed in the anvil is coupled directly to the joint between the tapered threads of the pipe and the ring gauge so as to dislodge any foreign matter or to flatten out any minor nicks in the tapered threads. The pipe being tested is then rotated by hand until it reaches its limit within the ring gauge and the position of the end of the pipe relative to the working face of the gauge is viewed through an appropriate opening which is provided in the tool so that it may be determined whether the end of the pipe has extended more than one thread beyond the working surface of the ring gauge, has failed to come within one turn of the working surface of the ring gauge, or is in-between those extremes. Thus, acceptability or unacceptability of the tapered threads of the pipe according to the ANSI specifications has been determined. The impulse energy provided from the spring-driven hammer is consistent because the release mechanism is a rapid release one not subject to frictional force variations and the hammer is guided so as to strike the anvil squarely and transfer the maximum energy through the anvil to the joint between the tapered threads being checked and the ring gauge which is being used in the checking procedure. The rapid disengagement of the hammer displacing handle from the hammer and the consistent degree of stressing of the spring as the hammer is displaced are achieved by a handle which locks into a fixed pivoting position during the hammer arming process, the end of the handle remote from that being held by the operator freely engaging, in a sliding fashion, a rod in the upper portion of the hammer, such engaging end being tapered for rapid disengagement from the rod as the handle is being depressed about its pivot point by the operator.

The results have shown the tool to provide consistent quality control of external taper-threaded pipes, thus permitting a setting of higher standards for such tapered threads and giving the entire pipe manufacturing and using industries means for achieving higher quality products and/or successful results when those products are used.

BRIEF DESCRIPTION OF THE DRAWINGS

Features of the present invention which are believed to be novel are set forth with particularity in the appended claims. The present invention, both as to its organization and manner of operation, together with further objects and advantages thereof, may be best understood by a reference to the following description taken in connection with the accompanying drawings, in which:

DETAILED DESCRIPTION OF THE PREFERRED EMBODIMENT

Figure 1:
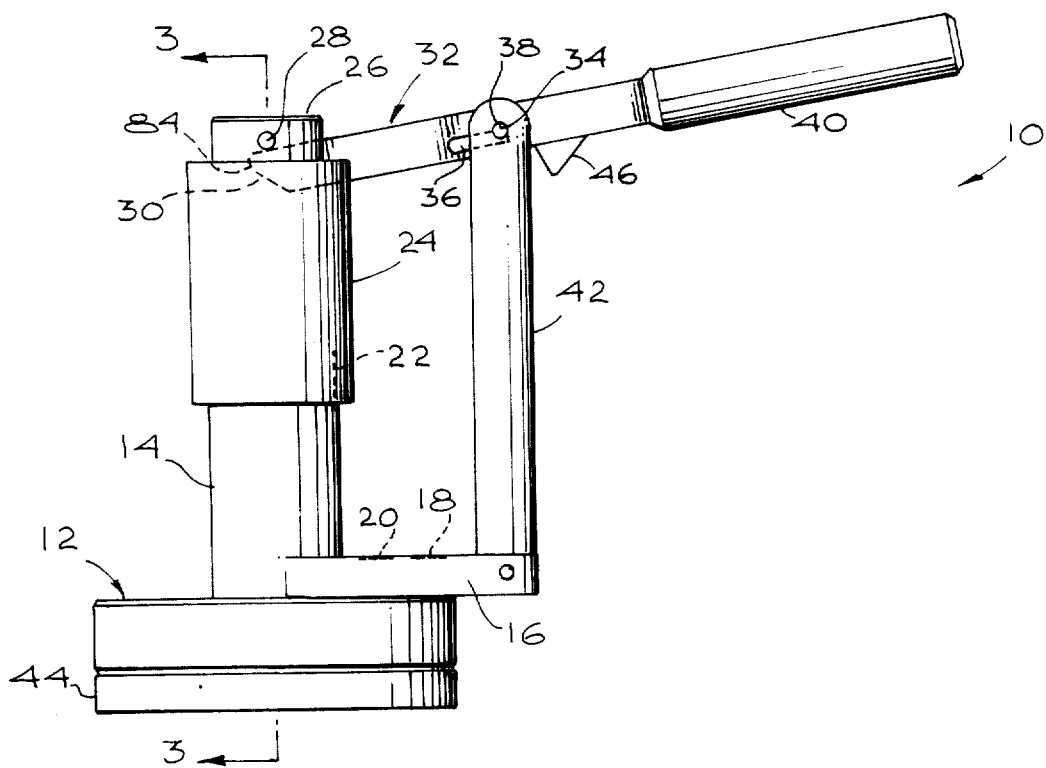
FIG. 1 is an elevational view of a pipe thread gauging tool according to my invention.
Figure 3:
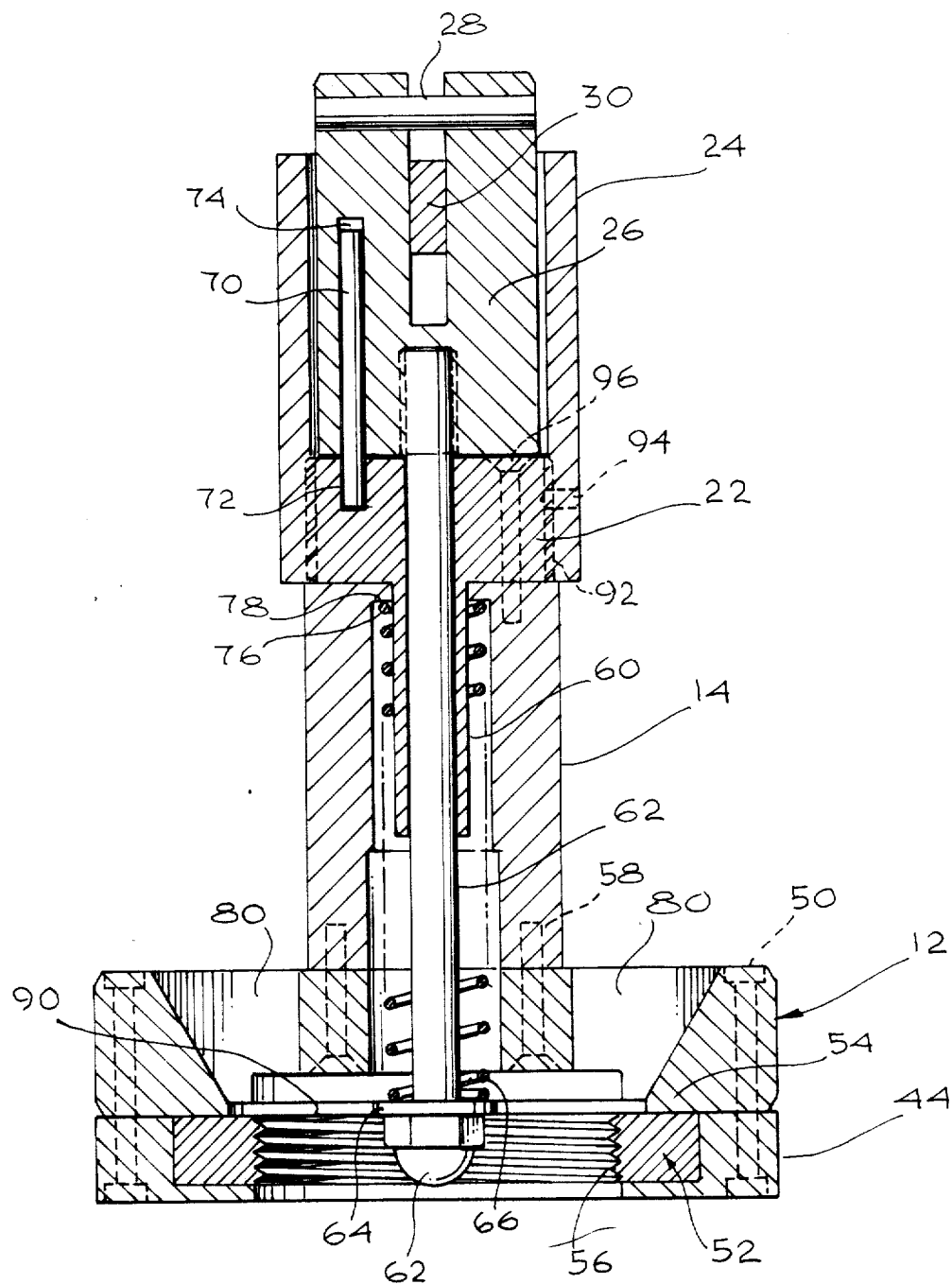
FIG. 3 is a cross-sectional view taken along line 3—3 of FIG. 1.

In FIGS. 1 and 3, tool 10 includes: base portion 12, body portion 14 secured to base portion 12 by means seen more clearly in FIG. 3, pivot support arm 16 secured by screws 18 and 20 to base 12, and anvil portion 22, which carries jacket 24 as by threaded portion 92 which may be seen more clearly in FIG. 3. Hammer portion 26 is free to move within jacket 24, as can be seen in FIG. 3. Hammer 26 has a rod 28 near its upper extremity which is engaged, during the arming of the tool, by activating end 30 of arm 32 which arm is carried pivotably upon pivot 34. Pivot 34 forms a part of pivot arm 16 and is fixed towards the upper end of vertical element 42 in pivot arm 16. Handle 32 has a slot 36 of such a width as to permit sliding motion of handle 32 along pivot rod 34 and also includes a recess 38, which can be seen more clearly in FIG. 1a. Handle 32 includes grip portion 40 at the end of handle 32 opposite to activating end 30. The ring gauge which is appropriate for the tapered thread being checked is secured within base portion 12 by means of plate 44. This fact is apparent in the cross-sectional view of FIG. 3. Stop 46 is provided on arm 32 to prevent the jamming of the hand of the operator between grip 40 and vertical member 42 of pivot arm 16.

Turning specifically to FIG. 3, cap 44 of base portion 12 is secured to that base portion by means of a plurality of countersunk bolts 50. Ring gauge 52 is held securely between cap 44 and the flange portion 54 of base 12. It is to be noted that ring gauge 52 carries the standard tapered threads 56 which determine the quality of the tapered threads being tested.

Base 12 is secured to body 14 by means of screws 58 circumferentially distributed, such as screws 58. Body 14 is a hollow cylinder in nature and its internal axial opening is of sufficient diameter to receive sleeve 60 (which is an extension of anvil 22 into body 14). The purpose of sleeve 60 is to act as a guide sleeve for rod 62 which, at one end, is secured to hammer 26 and at the other end terminates in cap 62 with a flange or washer 64 on which one end of compression spring 66 rests. Rod 62 is free to slide in sleeve 60. The downward travel of rod 62 is limited by the interfacing of hammer 26 with anvil 22.

Guide rod 70 is supported in anvil 22 and cooperates with a similarly shaped receiving opening 72 in anvil 22. Guide slot 74 is provided in hammer 26 to permit a sliding fit between slot 74 and guide pin 70.

The upper end 76 of compression spring 66 is engaged by internally directed flange 78 of body portion 14. Openings 80 are provided in base 12 to permit the operator to view the position of the end of any pipe which has been threaded into ring gauge 56, after the wrapping procedure utilizing the tool has been completed and the pipe has been turned into ring gauge 56 to the maximum degree that is achievable by hand. This visual checking is necessary to obtain the facts necessary to confirm compliance with standards.

In addition to threaded region 92, jacket 24 may be secured to anvil 22 by set screw 94. Further, anvil 22 may be secured to body 14 by screw 96.

Figure 2:
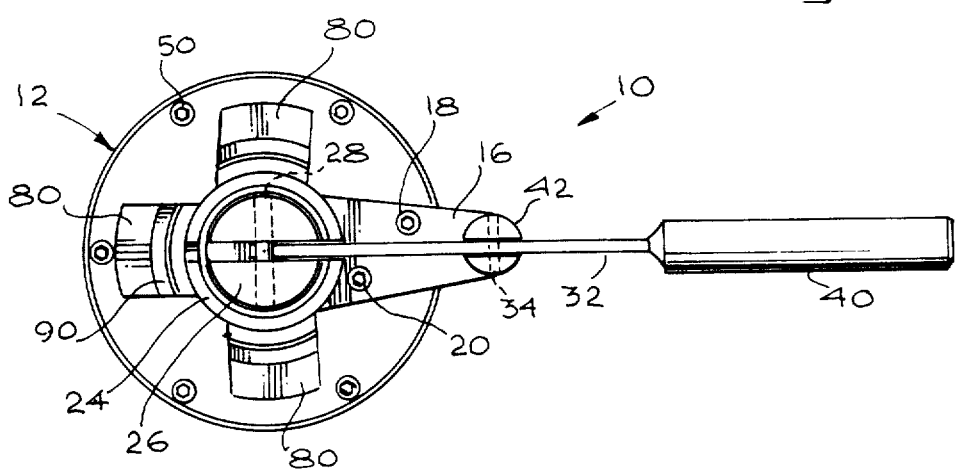
FIG. 2 is a plan view of the tool of FIG. 1.

In FIG. 2, elements corresponding to those discussed in connection with FIGS. 1 and 3 have been assigned corresponding item numbers.

Figure 1A:
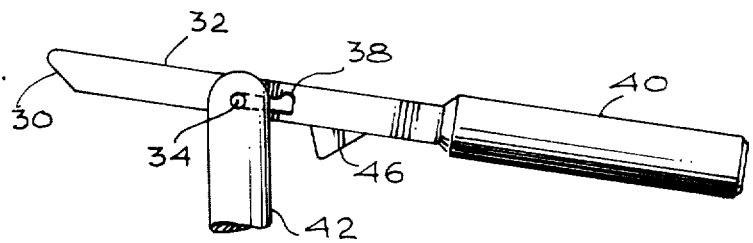
FIG. 1a is a schematic mechanical diagram of a portion of the device of FIG. 1.

The tool of FIGS. 1, 1a, 2 and 3 operates as follows. The tapered thread to be tested for compliance with standards is screwed into ring gauge 56 by hand until it will turn no further. At this time the bottom end of the pipe on which the thread to be tested is found is placed on a solid surface and grip 40 on handle 32 is grasped by the operator who first places end 30 under rod 28 and slides the handle 32 forward until pivot rod 34 falls into recess 38. At this point, grip 40 is pushed downward by the operator and, because of the engagement between end 30 of handle 32 and rod 28 in the upper end of hammer 26, hammer 26 is moved upwardly against the force of compression spring 66, causing spring 66 to be compressed, thus storing potential energy in spring 66. As grip 40 is pushed downward end 30 moves upward, as shown in FIG. 1a, until rod 28 is engaged by the shaped end 30 of handle 32. It is to be noted that end 30 is tapered back at a rather rapid angle so that once the contact between rod 28 and end 30 has passed region 84, rod 28 and hammer 26 are no longer urged upwardly and there is a free escape path for rod 28 past end 30 of handle 32. This path is free of friction between the end 30 of handle 32 and rod 28 by reason of the shaping which has just been described. Hammer 26 receives an impulse of energy from that stored in spring 66 and hammer 26 moves rapidly downwardly until it strikes anvil 22 at which time its kinetic energy is transferred into a mechanical shock which is transferred through body 14 to base 12 and, consequently, to ring gauge 56 which is held, mechanically rigid, in base 12 by reason of face plate 44. The direction of the impulse is downward and any dirt or filings in the threads of the piping checked will be dislodged. At the same time there is a certain amount of inertia in the pipe, the threads of which are being checked, and any nicks in the threads on the pipe being checked will be flattened out by relative motion between the hardened surface of ring gauge 56 and the relatively soft iron threads of the pipe. After the "wrap" or "tap" has been applied by means of my tool, the operator may then try once again to apply hand-force to adjust the thread of the pipe further into ring gauge 56. The ultimate placement of the thread in ring gauge 56 having thus been achieved, the position of the threads being checked can then be observed through openings 80 and it can be determined whether the threads have passed more than one thread beyond the working face 90 of ring gauge 56 or whether the threads have not moved into ring gauge 56 at least as far as one thread short of the working surface 90 of ring gauge 56. These, of course, are the tolerances set by the standards for quality acceptance of a taper-threaded pipe. That is, the pipe when in its final resting position in ring gauge 56, after hand adjustment of the pipe to its maximum internal position in ring gauge 56, has its threaded portion resting with not more than one thread past working surface 90 and not short more than one thread from working surface 90 of ring gauge 56.

The spring constant of compression spring 66 is chosen so as to assure that the magnitude of the mechanical impulse generated by the striking of anvil 22 by hammer 26 is adequate to remove dirt in the threads and to overcome nicks of a minor nature in the threaded portion of the pipe being tested.

While a particular embodiment of this invention has been shown and described, it will be apparent to those skilled in the art that variations and modifications may be made therein without departing from the spirit and scope of this invention. It is the purpose of the appended claims to cover all such variations and modifications.

I claim:

1. A tool for gauging pipe threads accurately, including:
   a base portion having an opening therethrough for supporting therein a ring gauge;
   a body portion mechanically coupled to said base portion, said body portion having an opening therethrough for communication with said opening in said base portion;
   an anvil portion supported from said body portion and having an axial opening therethrough coaxial with said opening on said body portion;
   a shaft, having first and second ends, slidably retained in said opening through said anvil and extending, at its first end, into said opening in said base portion and, at its second end, extending beyond said anvil portion;
   a hammer, secured to said second end of said shaft, said hammer having first and second faces;
   a slot diametrically disposed in said hammer and passing through said first face of said hammer;
   a bolt traversing said slot near said first face;
   a pivot arm supporting from said base portion and having, proximate its upper end, a pivot rod positioned substantially parallel with said bolt traversing said slot in said hammer;
   a handle having a grip end and an actuating end with a top and having a slot therein for cooperating with said pivot rod to permit pivoting and sliding of said handle about and along said pivot rod, said slot having first and second ends, said slot having such position in said handle that said actuating end of said handle is movable about said pivot rod and along said slot to the first end of said slot, in which position said handle is, at its actuating end, under and in engagement with said bolt near the tip of said actuating end;
   said first end of said shaft bearing flange means;
   said body portion including a flange portion positioned in said opening therethrough at the end of said body portion proximate to said anvil portion
   a compression spring encompassing said shaft in the region between said flange means on said shaft and said flange portion in said body portion and sized, diametrically, to engage said flange means and said flange portion, upon compression of said spring;
   whereby, upon depression of said grip end of said handle said actuating end thereof moves said hammer portion away from said anvil portion and compresses said compression spring, storing potential energy therein, which energy is released upon depressing said grip end of said handle until said actuating end of said handle is disengaged from said bolt and said hammer is urged forcefully toward said anvil portion by said potential energy in said spring.

2. Apparatus according to claim 1 in which said actuating end of said handle is shaped so that the tip thereof sweeps towards the grip end of said handle.

3. A tool for gauging pipe threads including:
   a base portion for carrying a ring gauge of preselected size, and a tapper portion mechanically connected to said base portion;
   said tapper portion including impulse means for producing a mechanical impulse of predetermined magnitude and duration.

4. Apparatus according to claim 3 in which said impulse means includes an anvil portion mechanically coupled to said base portion and hammer means movably coupled to said anvil portion; and spring means coupled to said hammer means and urging said hammer means towards said anvil.

5. Apparatus according to claim 3 including, in addition, a body portion interposed between said base portion and said anvil portion, said body portion having an internal flange therein for confining the motion, in one direction, of said spring means.

6. Apparatus according to claim 5 which includes, in addition, a shaft coupled at one end to said hammer means, passing through said spring means and carrying at its other end flange means for limiting the motion of said spring means in an opposite direction.

7. Apparatus according to claim 3 which includes, in addition, handle means for activating said impulse means.

8. Apparatus according to claim 3 in which said impulse means includes a compression spring.

9. Apparatus according to claim 7 in which said handle means has an actuating end of a predetermined shape.

10. Apparatus according to claim 4 in which said impulse means includes, in addition, a handle coupled to said spring means for causing compression thereof.

11. Apparatus according to claim 4 in which said handle is coupled through said hammer means to said spring means.

12. Apparatus according to claim 11 which includes means for rapidly de-coupling said handle from said hammer means.

* * * * *